April 5, 1938. H. W. BATCHELLER 2,113,366
RHEOSTAT
Filed Sept. 15, 1933
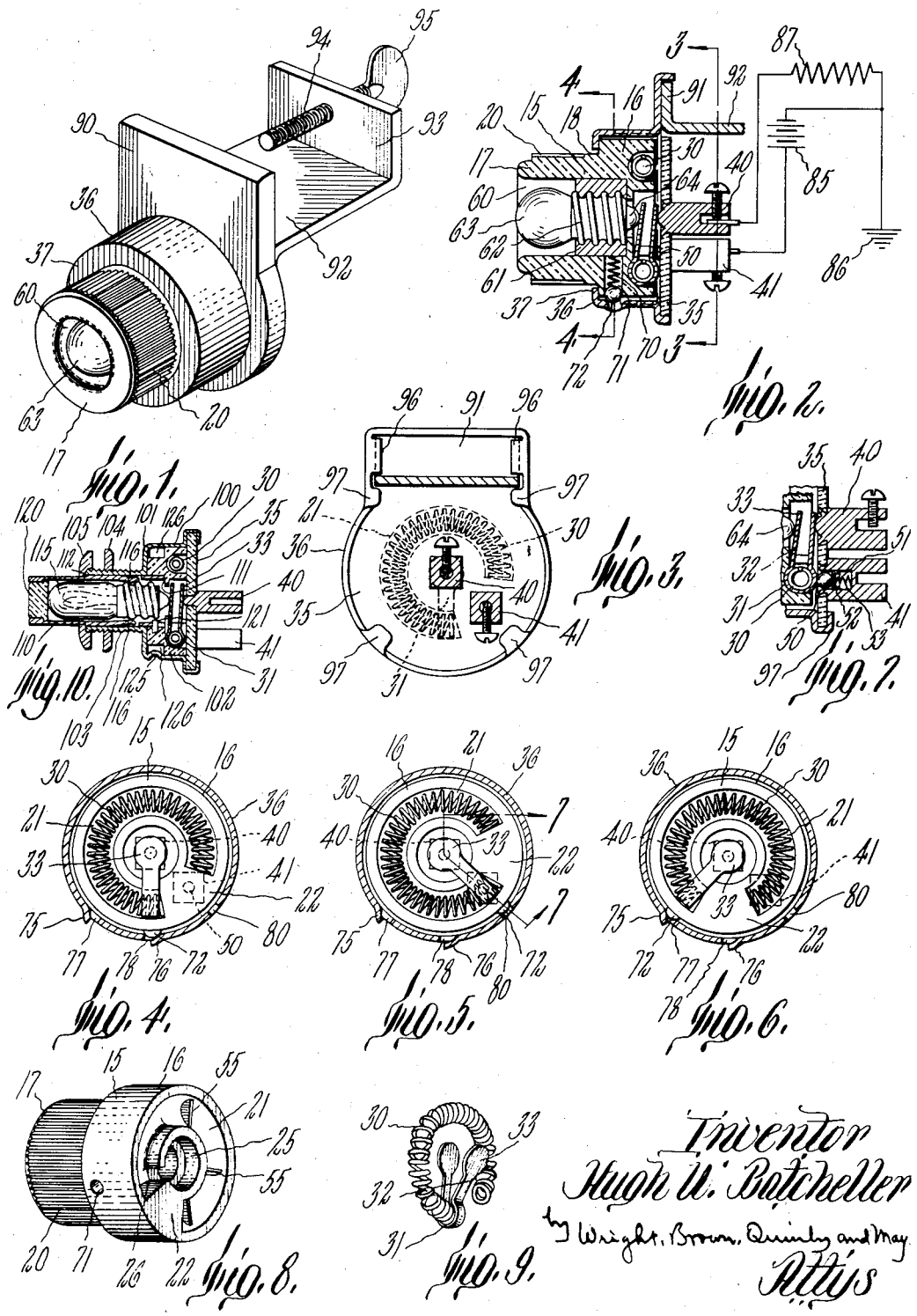
Inventor
Hugh W. Batcheller
by Wright, Brown, Quinby and May
Attys Patented Apr. 5, 1938

2,113,366

UNITED STATES PATENT OFFICE 2,113,366

RHEOSTAT

Hugh W. Batcheller, Waltham, Mass., assignor to Standard Mfg. Co., Worcester, Mass., a corporation of Massachusetts Application September 15, 1933, Serial No. 689,585

12 Claims. (Cl. 201—56)

This invention relates to a rheostat, preferably with a telltale lamp included therein, the structure being characterized by a compact arrangement of parts. While rheostats of this kind may be used in various places and for various purposes, the particular embodiment of the invention hereinafter described is more especially intended for use in an electric heating circuit for an automobile. Heaters are desirable in cold weather, and electric heaters are frequently used, such heaters being supplied with current from the storage battery which is now a part of the equipment of practically every automobile.

According to the invention, I provide a rheostat switch for controlling a heater circuit for an automobile, each rheostat being small and compact so as to be adapted to be mounted on the dashboard or instrument panel of an automobile without occupying an undue amount of space and without being in the way. As an automobile operator, using an electric heating device in his car, is apt to leave the car with the heater turned on, this running down the battery, I preferably equip the rheostat with a telltale light which glows whenever the circuit is closed. This warns the operator and tends to prevent accidental neglecting of the heater circuit when, for example, the car is put away for the night. The compact and efficient structure of my rheostat is made possible by various details of construction as appear more fully in the following description of the invention, and on the accompanying drawing, of which Figure 1 is a perspective view of a rheostat with a telltale light, adapted to be secured to any suitable support such as a dashboard of an automobile.

Figure 2 is a sectional view of the rheostat shown in Figure 1, the figure also including a wiring diagram.

Figure 3 is a section on the line 3—3 of Figure 2.

Figure 4 is a section on the line 4—4 of Figure 2.

Figures 5 and 6 are sections similar to Figure 4, but showing the parts in different positions of operation.

Figure 7 is a section on the line 7—7 of Figure 5.

Figure 8 is a perspective view of the rotatable member of the rheostat.

Figure 9 is a perspective view of a resistance element and a bridging conductor associated therewith.

Figure 10 is a sectional view of another embodiment of the invention.

The invention may be embodied in a rheostat comprising a rotatable member 15 which, as shown in Figures 2 and 8, may consist of a cylindrical body portion 16 and a knob portion 17 of reduced diameter, forming with the body portion 16 an external shoulder 18. The exterior surface of the knob portion 17 may be knurled as at 20 to facilitate manipulation of the knob. As shown in Figure 8, the rotatable member 15, which is preferably made of any suitable insulation material, such as a molded phenolic condensation product, rubber, glass, porcelain, or any other equivalent, may have in the rear face thereof an arcuate channel 21 which is concentric with the axis of rotation of the member 15. As shown, the arc of this channel 21 is less than 360°, so that a blank sector 22 is left on the rear face of the member 15. The member 15 is also provided with a central recess or hollow 25 in its rear face, this hollow being connected to the channel 21 as by a radial slot 26. The channel 21 is adapted to receive a helically coiled resistance wire 30, the channel being preferably of sufficient depth for the coil therein to be substantially flush with the rear face of the member 15. A tong-shaped bridging conductor 31 may be provided as shown in Figure 9. This conductor may be of any suitable material such as a sheet of copper or brass having considerable resilience. The intermediate portion of the member 31 is preferably shaped into arcuate form so as partly to encircle an end portion of the coil 30. The end portions or arms 32 of the conductor 31 are adapted to pass through the slot 26, the extremities of these arms being preferably widened as at 33 to provide broad contact faces to be engaged by contact elements, these broad end portions 33 being located in the central recess 25 of the member 15.

A suitable housing is provided for the member 15. As shown, this housing may consist of a back plate 35 of insulation material, to which is secured a metal shell 36 having an inturned flange 37 engaging on the shoulder 18 of the rotatable member 15 so as to retain the member 15 loosely against the back plate 35. A pair of suitable contact elements such as binding posts 40 and 41 are mounted on the back plate 35, each of these binding posts projecting through the plate for contact with conductors within the casing. The post 40 is preferably alined with the axis of rotation of the member 15. This post is thus opposite the central hollow 25 in which the end portions 33 of the bridging conductor 31 are located.

The end portions 33 are initially separated sufficiently so that, when the device is assembled, one of these end portions will press resiliently against the inner end of the post 40 so as to be in constant contact therewith. The post 41 is offset from the axis of the member 15 so as to be alined with the circle defined by the channel 21. A resilient contact element is associated with the post 41 and is arranged to press toward the member 15. Thus this contact element is always in contact either with some portion of the resistance coil 30, or the bridging conductor 31, or the sector 22 of the rear face of the member 15, the point of contact being dependent upon the angular position of the member 15 relative to the housing. The contact means carried by the post 41 may include one or more conducting elements, a portion of which is constantly in contact with the member 41, another portion being in contact with the member 15 or an element carried thereby. As shown, a ball 50 is located in the mouth of a bore 51 which extends into the end portion of the post 41. Next to the ball within the bore 51 is a cylindrical element 52 slidably fitted in the bore so as to be constantly in contact with a side wall thereof. A helical spring 53 is seated in the bore to press the element 52 and ball 50 outwardly so that the ball is maintained resiliently pressed toward the member 15. Thus the ball 50 is always in contact with the surface sector 22, the conductor 31, or the resistance element 30, according to the angular position of the member 15. Constant contact of the element 52 with the side wall of the bore in which it slides, provides a path for electrical current from the conductor 31 through the ball 50 and the element 52 to the post 41, when the ball 50 is in contact with the conductor 31 or the coil 30. Thus only a negligible current ever passes through the spring 53 even when relatively heavy currents are passing through the ball 50.

When the parts are as illustrated in Figure 4, the ball is in contact with the sector 22 of the rear face of the member 15. This is the open switch position of the device. If the member 15 is rotated so that the conductor 31 is brought into contact with the ball 50, as illustrated in Figure 5, then current may pass directly from the post 40 to the post 41 with practically no resistance between them. Further rotation of the member 15 results in the shifting of the resistance element 30 past the ball so that the ball 50 comes into contact with the coil 30 until the further end of the coil is reached as illustrated in Figure 6. When the parts are in the position therein illustrated, the binding post 40 is electrically connected to the binding post 41 through substantially the entire length of the resistance coil 30. In order to avoid longitudinal shifting of portions of the coil 30 as they rub past the ball 50, I may form the member 15 with a suitable number of ribs 55 in the arcuate channel 21, each of these ribs being adapted to enter between a pair of consecutive turns in the coil 30 which is located in the channel 21.

If the electric heater is left in operation in an automobile for any considerable period of time when the generator is not running, it is liable to run down and injure the battery. To avoid as far as possible the accidental leaving of a heater in operation, I may provide a telltale light on the rheostat so as to warn the operator that the heating circuit is in operation. To this end the member 15 may be provided with a central bore 60, this bore including the recess 25 as a part thereof so that it extends entirely through the member 15 and is in coaxial relation therewith. As shown, the bore may have different diameters at different points. Mounted within the bore 60 is a suitable lamp socket 61, the particular form of this lamp socket depending upon the type of lamp base which is to be employed. As shown, it is threaded to receive the threaded base 62 of a lamp 63. The socket 61 is so arranged as to present a terminal 64 of the lamp base for contact with one of the end portions 33 of the bridging conductor 31. Thus one terminal of the lamp is constantly in contact with the bridging conductor 31 and consequently with the binding post 40. The threaded shell of the lamp base 62, which constitutes the other terminal of the lamp, is in contact with the socket member 61. The latter is preferably grounded in any suitable manner. As shown, a spring 70 is located in a radial bore 71 extending through the side wall of the member 15. A ball 72 is located in the mouth of the bore 71 and bears against the outer end of the spring 70. The spring thus presses the ball outwardly and also connects the ball electrically with the socket member 61. The ball is pressed against the metal casing shell 36, and, as the latter is preferably grounded, the lamp base shell 62 is thus grounded through the spring 70, the ball 72 and the casing shell 36. The spring-pressed ball 72 not only serves as an electrical conductor to ground the lamp base, but also may be employed as a yielding detent to hold the member 15 in predetermined angular positions. To this end, the exterior surface of the shell 36 may be recessed by indentations, slots, or otherwise, to receive the ball 72. As shown in Figures 4, 5 and 6, two slots are provided with wall portions in the shell struck outwardly as at 75 and 76 so as to permit the ball 72 to enter the corresponding slot 77 or 78 sufficiently to stop further rotation of the member 15 in one direction. Thus Figure 4 illustrates the ball 72 seated in the slot 78 in a manner to prevent rotation in a clockwise direction. The outwardly struck element 76, however, permits counter-clockwise rotation from this position. Figure 6 shows the ball 72 projecting into the slot 77 so as to prevent further rotation of the member 15 in a counter-clockwise direction. The slots 77 and 78 thus furnish definite limit stops for the rotation of the member 15. In addition to these limit stops, other slots or indentations may be formed in the casing to hold the member 15 yieldingly in other predetermined angular positions. One such slot 80 is illustrated on the drawing. This slot is of suitable width to permit the ball 72 to enter a short distance, such distance being sufficient to require slight extra effort to turn the member 15 in either direction from such position. The slot 80, as shown, is located to arrest the movement of the member 15 when the bridging conductor 31 has moved into contact with the ball 50. This enables the operator to turn the heating circuit on full by the sense of touch, since additional effort is required to turn the member 15 beyond this point. Additional slots or equivalent recesses similar to the slot 80 may be provided at various points around the circumference of the casing shell 36 to arrest the member 15 at angular positions corresponding to predetermined portions of the resistance member 30 thrown into the circuit.

The rheostat may be employed in a heating circuit as illustrated in Figure 2. As therein shown, the binding post is connected with a wire leading to a battery 85 which may be grounded as at 86. The binding post 40 is connected to a heating unit 87 which is also grounded. Thus, when the member 15 is turned from the "off" position illustrated in Figure 4 to the "on" position illustrated in Figure 5, the live terminal 41 is simultaneously connected to the heater element 87 and the lamp 63 through the bridging conductor 31. If it is desired to reduce the current to the heating element, the member 15 is additionally rotated as far as desired, to bring into the circuit more and more of the resistance element 30, the limit of such motion being reached when substantially all of the element 30 has been brought into the circuit, as illustrated in Figure 6. It is evident that, as long as the circuit is closed through the heater element 87, the circuit through the lamp 63 will also be closed.

Figure 1 illustrates suitable clamping means by which the rheostat may be conveniently mounted on an automobile dashboard or the like. The casing shell 36 is provided with an extension 90 adapted to receive the bent up end 91 of a clamping member 92 which is also bent up as at 93. The upstanding portion 93 may be threaded to receive a screw 94 with a finger piece 95 at the end thereof, the arrangement being such as to permit a dashboard or the like to be clamped between the upstanding portion 91 and the adjacent end of the screw 94. The casing shell 36 is preferably provided with a pair of ears 96 on the extension 90, these ears being turned inwardly against the face of the upstanding member 91 in order to secure the rheostat to the clamping member. The casing shell 36 may also have additional ears 97 turned inwardly against the rear face of the back plate 35 to hold the same in position.

Figure 10 illustrates a form of rheostat structure differing in certain details from that shown in Figure 2. To the back plate 35 is secured a metal housing member 100 having an inwardly projecting flange portion 101 to retain a centrally-bored rotatable member 102 of insulation material. The housing 101 also includes a tubular portion 103 projecting from the inner edge of the flange 102 and adapted to pass through a hole in the dashboard of an automobile, or other support. The tubular portion 103 may be threaded to receive a pair of nuts 104 and 105 between which the dashboard may be clamped so as to hold the rheostat firmly in position. A hollow metal tube 110 is snugly but rotatably fitted in the tube 103, its inner end seating against an internal shoulder 111 in the rotatable member 102. An external shoulder 112 on the tube 110 engages the nut 105 to maintain the tube 110 within the housing tank 103. A lamp 115 fits within the tube 110, a pair of resilient tongues 116 being struck inwardly from the walls of the tube 110 to clamp the base of the lamp 115. This holds the lamp in place and provides an electrical connection for the shell of the lamp base. The end terminal of the lamp base contacts with a portion of the bridging conductor 31. A suitable window or lens 120 of plain or colored glass may be mounted in the outer end of the tube 110 to protect the lamp 115.

The member 102 is adapted to be rotated by the tube 110. To this end a pin 121 is mounted in the member 102 to project inwardly into the bore thereof. The inner end of the tube 110 is slotted to receive the pin 121, this slot and pin connection between the member 102 and the tube 110 causing the two to rotate together.

To limit the angle of rotation of the member 102, an inwardly projecting lug 125 may be provided in the wall of the housing 100, this lug riding in a rabbet or groove 126 in the periphery of the member 102, this groove being not completely circular, but leaving a small ungrooved portion 126 of the periphery to engage the lug 125.

It is evident that various modifications and changes may be made in the specific embodiments of the inventions herein shown and described without departing from the spirit or scope thereof as defined in the following claims.

I claim:

1. A device of the class described, comprising a rotatable member having a body portion and a knob portion of reduced diameter forming an annular shoulder with said body portion, said member having in its rear end face an arcuate channel to receive a helical coil of resistance wire, a central recess, and a radial channel from said arcuate channel to said central recess, a coil of resistance wire in said arcuate channel, a conductor in contact with said coil adjacent to the end thereof and extending through said radial channel into said central recess, a back plate against the rear face of said rotatable member having a central binding post constantly in contact with said conductor and a second binding post positioned for sliding contact with the turns of said coil as said member is rotated, a housing element surrounding the body portion of said member and secured to said back plate, said housing element having an inturned flange engaging said shoulder to hold said rotatable member against said back plate, and laterally projecting means to limit the angle of rotation of said member.

2. A device of the class described, comprising a rotatable member having a central bore therethrough, a resistance unit arranged in arcuate form on the rear end of said member, a lamp mounted in said bore, a bridging conductor connecting one of the lamp terminals with an end portion of said resistance unit, a casing for said member including a back plate, a central terminal on said plate in contact with said bridging conductor, and a second terminal on said plate positioned for sliding contact with said resistance unit when said member is rotated.

3. A device of the class described, comprising a rotatable member of insulating material having a central bore therethrough, a socket in said bore adapted to receive a lamp base, a casing including a back plate and a nonrotatable metal member surrounding said rotatable member and secured to said back plate, said metal member having a series of lateral recesses therein, a pair of terminal elements on said back plate insulated from said metal member and from each other, a bridging conductor connecting said lamp base with one of said terminal elements and movable into and out of contact with the other terminal element by rotation of said rotatable member, and resilient means extending through the wall of said rotatable member and electrically connecting said socket and said metal casing member, said resilient means including an element arranged to engage in said recesses successively as the rotatable member is rotated.

4. A variable resistance device, comprising a rotatable member, a stationary metal member having recesses therein, resilient means carried by said rotatable member and cooperating with said recesses to yieldingly hold said rotatable member in predetermined angular positions, an elongated resistance element carried by said rotatable member for rotation therewith, a telltale lamp mounted in said rotatable member, a conductor connecting one of the lamp terminals with said resistance element, and means including said resilient means electrically connecting the other terminal of said lamp with said stationary member.

5. In a variable resistance device, a stationary casing having a back plate and a cylindrical side wall with an inturned flange, a hollow member rotatable in said casing, said member having a recessed rear face bearing against said back plate and a shoulder engaging said flange to retain the member in position, a resistance element on said rear face, a central binding post on said back plate substantially alined with the axis of rotation of the member and electrically connected to an end of said resistance element, an open-ended lamp socket within the hollow of said member, a lamp engaged in said socket, a resilient conductor between and in contact with the terminal of said lamp and said central binding post, and a terminal on said casing in contact with said resilient conductor when said member is in a predetermined angular position and in contact with various portions of said resistance element when said member is in other angular positions.

6. In a device of the class described, a rotatable insulation member having a central bore therethrough and a rear face with an arcuate channel concentric with said bore and a radial slot from the bore to the end of said channel, means in said bore to receive a lamp base so that a terminal element of the lamp in said socket is presented toward the rear end of the bore, a helically coiled resistance element seated in said channel, and a tong-shaped conductor gripping an end portion of said resistance coil, the end portions of said conductor extending through said slot to the axis of said bore, one of said end portions of the conductor being positioned to engage said lamp terminal.

7. A device of the class described, comprising a rotatable member having a body portion and a knob portion of reduced diameter forming an annular shoulder with said body portion, said member having at its rear end a helical coil of resistance wire sunk flush with the rear face of the member and arranged in the form of an arc concentric with the axis of rotation of the member, a casing including a rear portion abutting the rear face of said member and a slide portion enclosing the body portion of said member and engaging said shoulder, a central binding post mounted on the rear portion of said casing, a bridging conductor in contact with an end of said resistance coil and having a portion yieldingly engaging said binding post, and a second binding post mounted on the rear portion of said casing and having a contact element yieldingly pressed into contact with said coil.

8. A device of the class described, comprising a rotatable member of insulating material having an axial bore therethrough, a lamp socket mounted in said bore and open at both ends, a resistance unit carried at the rear end of said member and arcuately arranged concentrically to the axial rotation, a bridging conductor in contact with an end of said resistance unit, said conductor having resilient portions located at the center of said rear face of the rotatable member for engagement by the base of a lamp mounted in said socket, and a fixed contact element adapted for sliding engagement with said resistance unit when said member is rotated.

9. In a variable resistance device, a cylindrical metal shell having an inturned flange at one end, a plate of insulating material secured across the opposite end of said shell, a hollow rotatable member having a portion retained within said shell by said flange and another portion projecting beyond said flange, a pair of relatively movable elements engaged by said plate and rotatable member respectively, one of said elements being an elongated resistance element, the other said element being a contact element in sliding contact with said resistance element, a lamp mounted within said hollow rotatable member, means electrically connecting one terminal of said lamp with said shell, means electrically connecting the other terminal of said lamp with one of said elements, two connection terminals mounted on said plates, and means electrically connecting said connection terminals respectively with said elements.

10. In a combined rheostat and switch device, a housing comprising a rear wall member of insulating material and a metal member attached to said rear wall and having an aperture opposite said wall, a hollow operating member projecting through and rotatable in said aperture, said operating member and housing including cooperating means for retaining a portion of said operating member within said housing, a pair of relatively movable elements engaged by said rear wall and said operating member respectively, one of said elements being an elongated resistance element, the other said element being a contact element in sliding contact with said resistance element, a lamp mounted within said operating member, means electrically connecting one terminal of said lamp with said metal housing member, means electrically connecting the other terminal of said lamp with one of said elements, two connection terminals mounted on said wall member, and means electrically connecting said connection terminals respectively with said elements.

11. In a combined rheostat and switch device, a hollow manually rotatable member, an electric lamp mounted in the hollow of said member, a stationary housing supporting said member and from which said member projects, an elongated resistance element arranged in a circular arc concentric with the axis of rotation of said member, a pair of connection terminals extending through the portion of the housing opposite said rotatable member, and means operable by rotation of said member to connect said lamp and a variable portion of said resistance element into a circuit including said pair of connection terminals.

12. A variable resistance device comprising a stationary casing having an opening, a hollow member rotatably supported within said casing and projecting through said opening, a lamp socket mounted within said hollow member and rotatable therewith, a lamp in said socket, an elongated resistance element arcuately disposed within said casing concentrically with the axis of rotation of said hollow member, a pair of terminals on said casing connectible with said lamp, and connection means operable by rotation of said hollow member to connect any desired portion of said resistance element between said terminals, said means including a conductor in sliding contact with said resistance element.

HUGH W. BATCHELLER.